(12) United States Patent
Ando

(10) Patent No.: US 10,766,308 B2
(45) Date of Patent: Sep. 8, 2020

(54) PNEUMATIC TIRE FOR TWO-WHEELED AUTOMOTIVE VEHICLE

(71) Applicant: SUMITOMO RUBBER INDUSTRIES LTD., Kobe-shi, Hyogo (JP)

(72) Inventor: Kanta Ando, Kobe (JP)

(73) Assignee: SUMITOMO RUBBER INDUSTRIES LTD., Kobe-shi, Hyogo (JP)

(*) Notice: Subject to any disclaimer, the term of this patent is extended or adjusted under 35 U.S.C. 154(b) by 350 days.

(21) Appl. No.: 15/833,635

(22) Filed: Dec. 6, 2017

(65) Prior Publication Data
US 2018/0244110 A1   Aug. 30, 2018

(30) Foreign Application Priority Data

Feb. 28, 2017  (JP) ................. 2017-036324

(51) Int. Cl.
*B60C 9/22*   (2006.01)
*B60C 9/26*   (2006.01)
*B60C 9/20*   (2006.01)
*B60C 9/18*   (2006.01)
*B60C 9/00*   (2006.01)

(52) U.S. Cl.
CPC .............. *B60C 9/20* (2013.01); *B60C 9/0007* (2013.01); *B60C 9/0042* (2013.01); *B60C 9/1807* (2013.01); *B60C 9/2003* (2013.01); *B60C 9/2009* (2013.01); *B60C 9/22* (2013.01); *B60C 9/263* (2013.01); *B60C 2009/2016* (2013.01); *B60C 2009/2032* (2013.01); *B60C 2009/2041* (2013.01); *B60C 2009/2223* (2013.01); *B60C 2200/10* (2013.01)

(58) Field of Classification Search
CPC .......... B60C 9/20; B60C 9/18; B60C 2200/10
See application file for complete search history.

(56) References Cited

FOREIGN PATENT DOCUMENTS

| EP | 0416893 A2 * | 3/1991 | ............. B60C 11/00 |
|---|---|---|---|
| EP | 0501782 A2 * | 9/1992 | ............. B60C 9/263 |
| JP | 2015-174569 A | 10/2015 | |

* cited by examiner

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A band 12 includes a center portion C, a pair of intermediate portions M, and a pair of outer end portions E. The center portion C is formed from a first band member 40 and that extends in a circumferential direction. Each intermediate portion M is formed from a second band member 42 and that extends so as to form a mesh-like shape. The second band member 42 includes a plurality of first tilt portions 44 extending so as to be tilted relative to the circumferential direction and a plurality of second tilt portions 46 extending so as to be tilted relative to the circumferential direction in a direction opposite to a direction in which the first tilt portions 44 are tilted. Each outer end portion E is formed from a third band member 54 and that extends in the circumferential direction.

6 Claims, 3 Drawing Sheets

PNEUMATIC TIRE FOR TWO-WHEELED AUTOMOTIVE VEHICLE

This application claims priority on Patent Application No. 2017-036324 filed in JAPAN on Feb. 28, 2017. The entire contents of this Japanese Patent Application are hereby incorporated by reference.

BACKGROUND OF THE INVENTION

Field of the Invention

The present invention relates to pneumatic tires to be mounted to two-wheeled automotive vehicles.

Description of the Related Art

A tire that is to be mounted to a two-wheeled automotive vehicle and that includes a band in which a cord is helically wound substantially in the circumferential direction, is known. The band is called jointless band (JLB). This conventional tire provides excellent steering stability and ride comfort during straight running. Meanwhile, this tire is likely to be poor in torsional stiffness. In a two-wheeled automotive vehicle, the vehicle body is tilted during cornering. This tire makes it difficult to obtain a great camber thrust when the vehicle body is tilted and undergoes cornering. There is a room for improving cornering performance in the conventional tire.

JP2015-174569 (hereinafter, referred to as Patent Literature 1) discloses a band in which cords are tilted relative to the circumferential direction to form a mesh-like shape. In the tire having this band, the band contributes to improvement of stiffness in the axial direction. The tire has an excellent torsional stiffness. This tire can cause a camber thrust that is greater than that by a conventional tire. The tire disclosed in Patent Literature 1 provides excellent cornering performance.

However, the band of the tire is inferior, in holding force in the radial direction, to a band that is helically wound in the circumferential direction. The tire is inferior, in stability during a high speed running, to a conventional tire. Furthermore, the tire has a region in which no cords extend, at the outer end, in the axial direction, of the band. In this region, improvement of stiffness by the band cannot be expected. There is a room for improving high-speed cornering performance in this tire.

An object of the present invention is to provide a tire, for a two-wheeled automotive vehicle, which allows both stability at a high speed and cornering performance to be achieved.

SUMMARY OF THE INVENTION

A tire, for a two-wheeled automotive vehicle, according to the present invention includes: a tread; a carcass; and a band. The band is layered inward of the tread in a radial direction and outward of the carcass in the radial direction. The band includes a center portion disposed at a center in an axial direction, a pair of intermediate portions each disposed outward of the center portion in the axial direction, and a pair of outer end portions disposed outward of the intermediate portions, respectively, in the axial direction. The center portion is formed from a first band member that is formed from a cord and a topping rubber and that extends in a circumferential direction. Each intermediate portion is formed from a second band member that is formed from a cord and a topping rubber and that extends so as to form a mesh-like shape. The second band member includes a plurality of first tilt portions extending so as to be tilted relative to the circumferential direction and a plurality of second tilt portions extending so as to be tilted relative to the circumferential direction in a direction opposite to a direction in which the first tilt portions are tilted. Each outer end portion is formed from a third band member that is formed from a cord and a topping rubber and that extends in the circumferential direction.

Preferably, a gap between an outer end, in the axial direction, of the second band member and an inner end, in the axial direction, of the third band member, is not greater than 4 mm.

Preferably, a gap between an outer end, in the axial direction, of the first band member and an inner end, in the axial direction, of the second band member is not greater than 4 mm.

Preferably, each intermediate portion has a plurality of first circumferentially extending portions. The first circumferentially extending portions form an outer end, in the axial direction, of the intermediate portion, and extend in the circumferential direction. The first circumferentially extending portions are disposed between the first tilt portions and the second tilt portions, and are continuous with the first tilt portions and the second tilt portions, respectively.

Preferably, each intermediate portion has a plurality of second circumferentially extending portions. The second circumferentially extending portions form an inner end, in the axial direction, of the intermediate portion, and extend in the circumferential direction. The second circumferentially extending portions are disposed between the first tilt portions and the second tilt portions, and are continuous with the first tilt portions and the second tilt portions, respectively.

Preferably, the cord of each of the center portion, the intermediate portions, and the outer end portions is formed from a steel.

Preferably, the cord of each of the center portion, the intermediate portions, and the outer end portions is formed from an aramid fiber.

The tire according to the present invention includes the intermediate portions of the band, and thus exhibits an excellent cornering performance. Furthermore, the tire has the center portion and the outer end portions of the band, and thus exhibits excellent high speed straight running performance and cornering performance.

DESCRIPTION OF THE PREFERRED EMBODIMENTS

The following will describe in detail the present invention based on preferred embodiments with reference where appropriate to the accompanying drawing.

Figure 1:
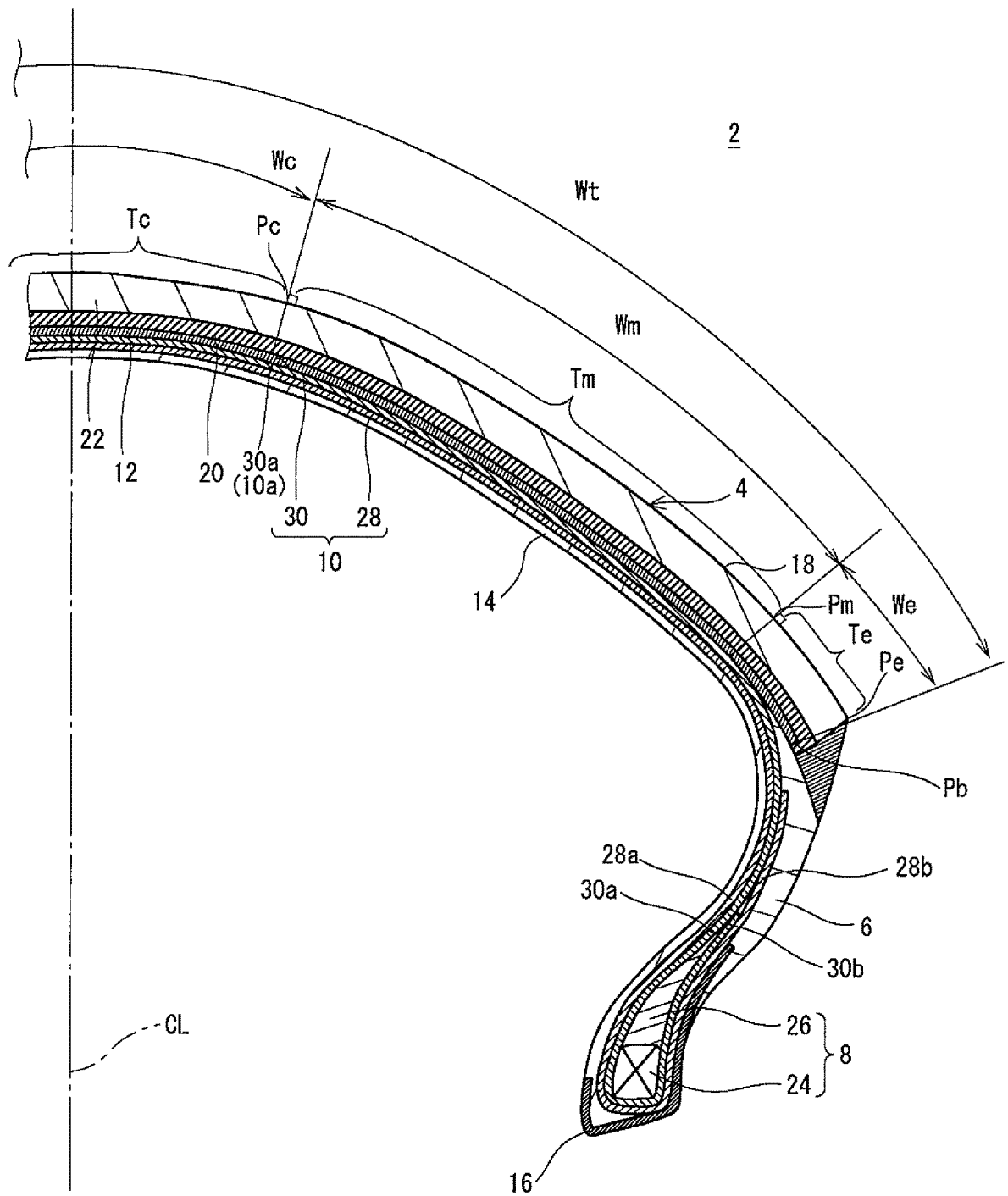
FIG. 1 is a cross-sectional view of a part of a pneumatic tire according to one embodiment of the present invention.

FIG. 1 shows a pneumatic tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire. The tire 2 has a shape which is symmetric about the equator plane except for a tread pattern.

The tire 2 has a tread 4, sidewalls 6, beads 8, a carcass 10, a band 12, an inner liner 14, and chafers 16. The tire 2 is of a tubeless type. The tire 2 is mounted to a two-wheeled automotive vehicle.

The tread 4 has a shape that projects outward in the radial direction. The tread 4 forms a tread surface 18 that comes into contact with a road surface. The tread 4 has grooves formed therein, which is not shown. A tread pattern is formed by the grooves. The tread 4 has a base layer 20 and a cap layer 22. The cap layer 22 is disposed outward of the base layer 20 in the radial direction. The cap layer 22 is layered over the base layer 20. The base layer 20 is formed from a crosslinked rubber having an excellent adhesiveness. A typical base rubber of the base layer 20 is natural rubber. The cap layer 22 is formed from a crosslinked rubber having excellent wear resistance, heat resistance, and grip performance.

Each sidewall 6 extends almost inward from the end of the tread 4 in the radial direction. The radially outer end of the sidewall 6 is joined to the tread 4. The sidewall 6 is formed from a crosslinked rubber having excellent cut resistance and weather resistance. The sidewall 6 prevents damage to the carcass 10.

Each bead 8 is disposed inward of the sidewall 6 in the radial direction. The bead 8 includes a core 24, and an apex 26 that extends outward from the core 24 in the radial direction. The core 24 is ring-shaped, and includes a wound non-stretchable wire. A typical material of the wire is steel. The apex 26 is tapered outward in the radial direction. The apex 26 is formed from a highly hard crosslinked rubber.

The carcass 10 includes a first ply 28 and a second ply 30. The first ply 28 and the second ply 30 are extended on and between the beads 8 on both sides, along the tread 4 and the sidewall 6. The first ply 28 is turned up around the core 24 from the inner side toward the outer side in the axial direction. By the first ply 28 being turned up, a main portion 28a and turned-up portions 28b are formed in the first ply 28. The second ply 30 is turned up around the core 24 from the inner side toward the outer side in the axial direction. By the second ply 30 being turned up, a main portion 30a and turned-up portions 30b are formed in the second ply 30. The end of the turned-up portion 28b of the first ply 28 is disposed outward of the end of the turned-up portion 30b of the second ply 30 in the radial direction.

Each of the first ply 28 and the second ply 30 includes multiple cords aligned with each other, and topping rubber. An absolute value of an angle of each cord relative to the equator plane is from 75° to 90°. In other words, the carcass 10 forms a radial structure. The cord is formed from an organic fiber. Preferable examples of the organic fiber include polyester fibers, nylon fibers, rayon fibers, polyethylene naphthalate fibers, and aramid fibers. The carcass may be formed from one carcass ply.

The band 12 is disposed outward of the carcass 10 in the radial direction. The band 12 is disposed inward of the tread 4 in the radial direction. The band 12 extends along the tread 4 from one end, of the tread 4, in the axial direction to the other end thereof in the axial direction. In the tire 2, the band 12 reinforces the carcass 10. The band 12 forms a reinforcing layer for the carcass 10.

The tire 2 may include a belt, which is not shown. The belt is disposed inward of the tread 4 in the radial direction. The belt is layered over the carcass 10. The belt reinforces the carcass. Both the band 12 and the belt may form the reinforcing layer. The belt includes multiple cords aligned with each other, and topping rubber. Each cord extends so as to be tilted relative to the equator plane. An absolute value of the tilt angle is typically not less than 10° and not greater than 35°. A material of the cord is preferably steel. An organic fiber may be used for the cord. The width, in the axial direction, of the belt is preferably not less than 0.7 times the maximal width of the tire. The belt may have two or more layers. The width of the belt is less than the width of the band 12 in the axial direction.

The inner liner 14 is disposed inward of the carcass 10. The inner liner 14 is joined to the inner surface of the carcass 10 near the equator plane CL. The inner liner 14 is formed from a crosslinked rubber excellent in airtightness. A typical base rubber of the inner liner 14 is an isobutylene-isoprene-rubber or halogenated isobutylene-isoprene-rubber. The inner liner 14 maintains internal pressure of the tire 2.

Each chafer 16 is disposed near the bead 8. When the tire 2 is mounted on a not-illustrated rim, the chafer 16 contacts with the rim. By the contact, a portion near the bead 8 is protected. The chafer 16 is formed from, for example, a fabric and rubber impregnated into the fabric.

Figure 2:
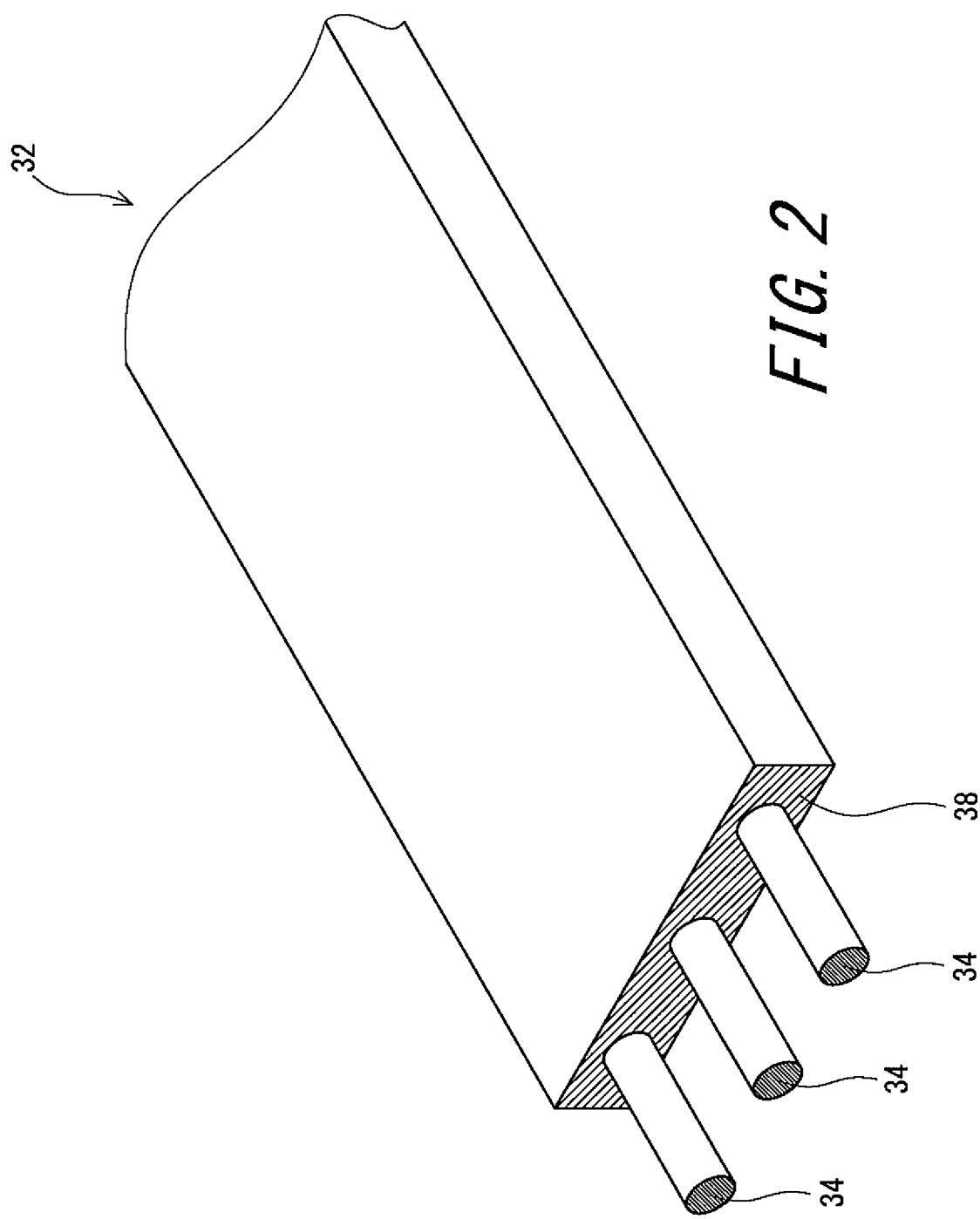
FIG. 2 illustrates a part of a strip used for the tire shown in FIG. 1.

FIG. 2 shows a strip 32 that forms the band 12. The strip 32 includes cords 34 as band cords, and a rubber member 38 that forms topping rubber through vulcanization. The strip 32 is an example of a strip used for the tire 2. The width of the strip 32 is, for example, 4.2 mm. The strip 32 has three cords 34 incorporated thereinside. The cord 34 is formed from steel. The cord 34 may be formed from an organic fiber. Preferable examples of the organic fiber include aramid fibers, nylon fibers, polyester fibers, rayon fibers, and polyethylene naphthalate fibers.

Figure 3:
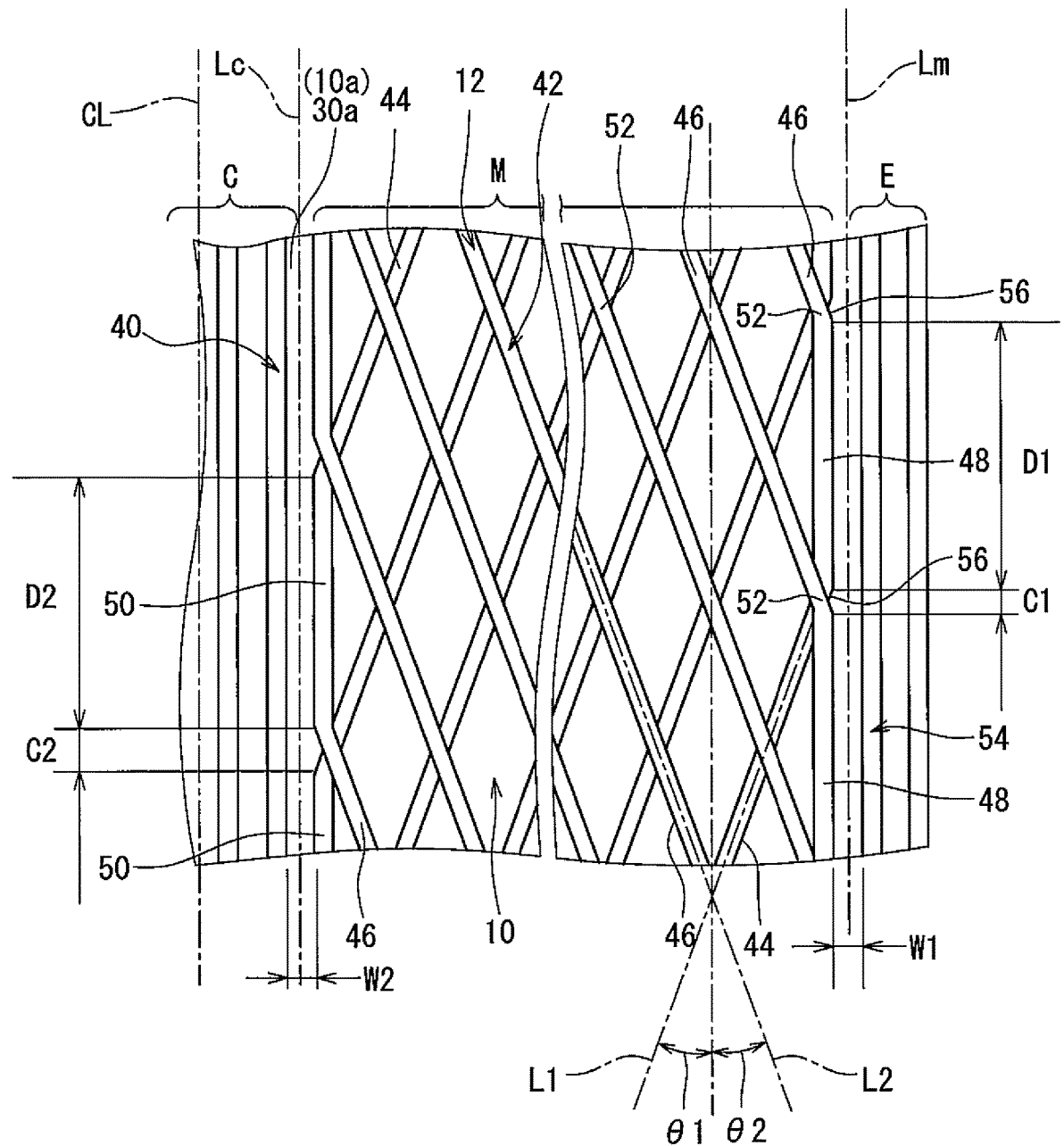
FIG. 3 illustrates parts of a carcass and a band of the tire shown in FIG. 1.

FIG. 3 shows a part of the carcass 10 of the tire 2 and a part of the band 12 of the tire 2. FIG. 3 shows the carcass 10 and the band 12 that are projected on a cylindrical surface. In FIG. 3, the up-down direction represents the circumferential direction of the tire 2, the left-right direction represents the axial direction of the tire 2, and the direction perpendicular to the surface of the drawing sheet represents the radial direction of the tire 2.

In the tire 2, an outer circumferential surface 30a of the second ply 30 forms an outer circumferential surface 10a of the carcass 10. The band 12 is layered over the outer circumferential surface 10a. The base layer 20 of the tread 4 is layered outward of the band 12 in the radial direction.

The band 12 includes a center portion C, a pair of intermediate portions M, and a pair of outer end portions E. The center portion C is disposed at the center in the axial direction. Each of the intermediate portions M is disposed outward of the center portion C in the axial direction. The outer end portions E are disposed outward of the intermediate portions M, respectively, in the axial direction.

The center portion C includes a first band member 40 formed from the cords and the topping rubber. The first band member 40 is formed by the strip 32 being vulcanized. The first band member 40 extends so as to be helically wound. The first band member 40 extends almost in the circumferential direction. The cord of the first band member 40 extends almost in the circumferential direction. The tilt angle of the cord relative to the circumferential direction is not greater than 5°, and more preferably not greater than 2°. In the center portion C, the number of the first band members 40 is one. In FIG. 3, the first lap and the second lap of the first band member 40 are shown.

Each of the intermediate portions M includes a second band member 42 formed from the cords and the topping rubber. The second band member 42 is formed by the strip 32 being vulcanized. The second band member 42 includes a plurality of first tilt portions 44, a plurality of second tilt portions 46, a plurality of first circumferentially extending portions 48, and a plurality of second circumferentially extending portions 50.

Each of the first tilt portions 44 extends so as to be tilted relative to the circumferential direction from the outer end of the intermediate portion M in the axial direction, to the inner end thereof in the axial direction. Each of the second tilt portions 46 extends so as to be tilted relative to the circumferential direction from the inner end of the intermediate portion M in the axial direction to the outer end thereof in the axial direction. The first tilt portion 44 and the second tilt portion 46 extend so as to be tilted relative to the circumferential direction in the opposite directions, respectively. The plurality of first tilt portions 44 and the plurality of second tilt portions 46 intersect each other.

Each of the first circumferentially extending portions 48 forms the outer end, in the axial direction, of the intermediate portion M. The first circumferentially extending portion 48 extends in the circumferential direction. One end of the first circumferentially extending portion 48 is continuous with the outer end, in the axial direction, of the first tilt portion 44. The other end of the first circumferentially extending portion 48 is continuous with the outer end, in the axial direction, of the second tilt portion 46.

Each of the second circumferentially extending portions 50 forms the inner end, in the axial direction, of the intermediate portion M. The second circumferentially extending portion 50 extends in the circumferential direction. One end of the second circumferentially extending portion 50 is continuous with the inner end, in the axial direction, of the second tilt portion 46. The other end of the second circumferentially extending portion 50 is continuous with the inner end, in the axial direction, of the first tilt portion 44.

In the tire 2, one second band member 42 forms the plurality of first tilt portions 44, the plurality of second tilt portions 46, the plurality of first circumferentially extending portions 48, and the plurality of second circumferentially extending portions 50. The intermediate portion M has a mesh-like shape formed by the second band member 42. The intermediate portion M may be formed from a plurality of the second band members 42.

In the intermediate portion M, the first tilt portion 44 and the second tilt portion 46 intersect each other to form an intersecting portion 52. At the intersecting portion 52, the first tilt portion 44 and the second tilt portion 46 overlap each other. The first tilt portion 44 and the second tilt portion 46 are integrated with each other by vulcanization. At the intersecting portion 52, the cord of the first tilt portion 44 and the cord of the second tilt portion 46 extend so as to intersect each other.

The second band member 42 extends so as to be grid-shaped. In the intermediate portion M, the second band member 42 is formed into a mesh-like shape. In the band 12, rhombic gaps (meshes) are formed. The rhombic gap is formed such that the long diagonal line extends in the circumferential direction and the short diagonal line extends in the axial direction. In the intermediate portion M, the second band member 42 repeatedly forms the rhombic gaps at regular pitches in the circumferential direction.

Each of the outer end portions E includes a third band member 54 formed from the cords and the topping rubber. The third band member 54 is formed by the strip 32 being vulcanized. The third band member 54 extends so as to be helically wound. The third band member 54 extends almost in the circumferential direction. The cord of the third band member 54 extends almost in the circumferential direction. The tilt angle of the cord relative to the circumferential direction is not greater than 5°, and more preferably not greater than 2°. The number of the third band member 54 of the outer end portions E is one. In FIG. 3, the first lap and the second lap of the third band member 54 are shown.

In FIG. 3, an alternate long and short dash line L1 represents the center line of the first tilt portion 44. An alternate long and short dash line L2 represents the center line of the second tilt portion 46. A double-headed arrow $\theta 1$ represents an angle of the center line L1 relative to the circumferential direction. The angle 81 represents the tilt angle of the first tilt portion 44. The angle $\theta 1$ also represents the tilt angle of the cord of the first tilt portion 44. A double-headed arrow 82 represents an angle between the center line L2 and the equator plane CL with respect to the circumferential direction. The angle $\theta 2$ represents an angle of the center line L2 relative to the circumferential direction. The angle $\theta 2$ represents the tilt angle of the second tilt portion 46. The angle 82 also represents the tilt angle of the cord of the second tilt portion 46.

A double-headed arrow D1 represents the length of the first circumferentially extending portion 48 in the circumferential direction. A double-headed arrow C1 represents a distance from one end of one of the first circumferentially extending portions 48 to the other end of the first circumferentially extending portion 48 that is different from and circumferentially adjacent to the one of the first circumferentially extending portions 48. In the intermediate portion M, the length D1 is preferably greater than the distance C1. A double-headed arrow D2 represents the length of the second circumferentially extending portion 50 in the circumferential direction. A double-headed arrow C2 represents a distance from one end of one of the second circumferentially extending portions 50 to the other end of the second circumferentially extending portion 50 that is different from and circumferentially adjacent to the one of the second circumferentially extending portions 50. In the intermediate portion M, the length D2 is preferably greater than the distance C2.

A double-headed arrow W1 represents a gap between the outer end, in the axial direction, of the second band member 42 and the inner end, in the axial direction, of the third band member 54. A double-headed arrow W2 represents a gap between the outer end, in the axial direction, of the first band member 40 and the inner end, in the axial direction, of the second band member 42. The gap W1 and the gap W2 are measured along the outer circumferential surface 30a (outer circumferential surface 10a of the carcass 10) of the second ply 30 in the axial direction.

An alternate long and short dash line Lc represents a boundary between the center portion C and the intermediate portion M. The alternate long and short dash line Lc extends in the circumferential direction through the mid-point between the outer end of the center portion C and the inner end of the intermediate portion M. An alternate long and short dash line Lm represents a boundary between the intermediate portion M and the outer end portion E. The alternate long and short dash line Lm extends in the circumferential direction through the mid-point between the outer end of the intermediate portion M and the inner end of the outer end portion E.

In FIG. 1, reference character Pc represents a point of intersection of: the tread surface 18; and a straight line that intersects the boundary Lc and is orthogonal to the tread surface 18. Reference character Pm represents a point of intersection of: the tread surface 18; and a straight line that intersects the boundary Lm and is orthogonal to the tread surface 18. Reference character Pe represents the end of the tread surface in the axial direction, that is, the tread end.

A single-headed arrow Wc represents the width of a center region Tc of the tread surface 18. The width Wc is a width from one of the points Pc to the other of the points Pc in the axial direction. A double-headed arrow Wm represents the width of an intermediate region Tm of the tread surface 18. The width Wm is a width from the point Pc to the point Pm. A double-headed arrow We represents the width of an outer end region Te of the tread surface 18. The width We is a width from the point Pm to the tread end Pe. The width Wc, the width Wm, and the width We are measured along the tread surface 18 in the axial direction.

During cornering of a two-wheeled automotive vehicle, a rider tilts inward the two-wheeled automotive vehicle. By the tilting, cornering of the two-wheeled automotive vehicle is achieved. The tire 2 has the tread surface 18 having a small curvature radius in order to facilitate tilting of the two-wheeled automotive vehicle. The curvature radius of the tread surface 18 is less than the curvature radius of the tread surface for a four-wheeled automotive vehicle. The tire 2 mounted to a two-wheeled automotive vehicle has a curvature radius which is generally not less than 50 mm and not greater than 150 mm.

During straight running, the center region Tc of the tread surface 18 mainly contacts with the ground. The center portion C of the band 12 is disposed inward of the center region Tc in the radial direction. The carcass 10 is held by the center portion C in the radial direction. The tire 2 provides an excellent stability in high speed straight running.

In this viewpoint, a ratio (Wc/Wt) of the width Wc to a tread width Wt is preferably not less than 0.03. Meanwhile, regarding the effect of improving torsional stiffness, the center portion C is inferior to the intermediate portion M. In order to obtain high cornering power during cornering, the ratio (Wc/Wt) is preferably not greater than 0.3.

During cornering, the intermediate region Tm of the tread surface 18 mainly contacts with the ground. The intermediate portion M of the band 12 is disposed inward of the intermediate region Tm in the radial direction. The intermediate portion M contributes to improvement of torsional stiffness. The tire can exhibit high cornering power during cornering. The tire 2 has an excellent cornering performance.

In this viewpoint, a ratio (Wm/Wt) of the width Wm to the tread width Wt is preferably not less than 0.2. Meanwhile, regarding the effect of holding the carcass 10, the intermediate portion M is inferior to the center portion C and the outer end portion E. Regarding the effect for improving stability during high speed running, the intermediate portion M is inferior to the center portion C and the outer end portion E. In order to improve stability during high speed running, the ratio (Wm/Wt) is preferably not greater than 0.48.

Furthermore, the tread surface 18 has the outer end region Te that includes the tread end Pe at the end in the axial direction. The outer end portion E is disposed inward of the outer end region Te in the radial direction. The carcass 10 is held, by the outer end portion E, in the radial direction in a portion outward of the intermediate portion M in the axial direction. In the tire 2, stability during high speed running is improved also by the outer end region Te. The outer end portion E allows the tire 2 to exhibit excellent stability during cornering at a high speed.

Furthermore, since the outer end portion E is disposed outward of the intermediate portion M in the axial direction, the effect of improving stiffness can be stably obtained also in the outer end portion of the tread 4 in the axial direction. The tire 2 allows steering stability during cornering to be improved.

In this viewpoint, a ratio (We/Wt) of the width We to the tread width Wt is preferably not less than 0.02. Meanwhile, in order to obtain the effect of the intermediate portion M for sufficiently improving cornering performance, the ratio (We/Wt) is preferably not greater than 0.2.

When absolute values of the tilt angles $\theta 1$ and $\theta 2$ of the cord of the intermediate portion M are great in the tire 2, the tire 2 can exhibit high cornering power. In this viewpoint, each of the angles $\theta 1$ and $\theta 2$ is preferably not less than 1°. In this case, the angle between the intersecting cords is not less than 2°. Each of the angles $\theta 1$ and $\theta 2$ is more preferably not less than 3°, and particularly preferably not less than 5°. Meanwhile, when absolute values of the angles $\theta 1$ and $\theta 2$ are small in the tire 2, the tire 2 has an excellent absorbability of shock from the unevenness of a road surface. The tire 2 provides excellent steering stability and ride comfort. In this viewpoint, each of the tilt angles $\theta 1$ and $\theta 2$ is preferably not greater than 20°, more preferably not greater than 15°, and particularly preferably not greater than 10°.

As shown in FIG. 3, a recess 56 is formed in the outer side portion, in the axial direction, of the intermediate portion M so as to be recessed inward in the axial direction in a portion that is axially outward of the intersecting portion 52. The recess 56 is disposed between the first circumferentially extending portions 48 adjacent to each other in the circumferential direction. When an external force acts on the tire 2, distortion is likely to concentrate in the recess 56. In the tire 2, the outer end portion E is disposed outward of the recess 56 in the axial direction. The outer end portion E reduces concentration of distortion in the recess 56. Thus, the tire 2 has an excellent durability while having the intermediate portion M.

From the viewpoint of durability, the gap W1 is preferably not greater than 4 mm, more preferably not greater than 2 mm, and particularly preferably 0 mm. That is, from the viewpoint of improvement of durability, the outer end, in the axial direction, of the intermediate portion M and the inner end, in the axial direction, of the outer end portion E are particularly preferably joined to each other.

Similarly to the gap W1, from the viewpoint of durability, the gap W2 is preferably not greater than 4 mm, more preferably not greater than 2 mm, and particularly preferably 0 mm. That is, from the viewpoint of improvement of durability, the outer end, in the axial direction, of the center portion C and the inner end, in the axial direction, of the intermediate portion M are particularly preferably joined to each other.

In the intermediate portion M, the first circumferentially extending portion 48 is disposed between the first tilt portion 44 and the second tilt portion 46. The first circumferentially extending portion 48 is continuous with the first tilt portion 44 and the second tilt portion 46, between the first tilt portion 44 and the second tilt portion 46. The first circumferentially extending portion 48 functions as a turning portion for and between the first tilt portion 44 and the second tilt portion 46. In a preforming process step, the first circumferentially extending portion 48 allows the turning portion of the strip 32 and a member forming the carcass 10 to be easily adhered to each other. The first circumferentially extending portion 48 is stably fixed to the outer circumferential surface 10a of the carcass 10. Since the first circumferentially extending portion 48 is provided, the intermediate portion M can stably exhibit the effect of improving stiffness. In this viewpoint, the length D1 is preferably greater than the distance C1. Furthermore, since the tire has the outer end portion E, even if the length D1 is made great and the distance C1 is made small, concentration of distortion in the recess 56 is inhibited.

Similarly to the first circumferentially extending portion 48, from the viewpoint that the intermediate portion M stably exhibits the effect of improving stiffness, the intermediate portion M preferably includes the second circumferentially extending portion 50. The length D2 of the second circumferentially extending portion 50 is preferably greater than the distance C2.

In order to obtain a high stiffness improving effect, the cords of the center portion C, the intermediate portion M, and the outer end portion E are preferably formed from aramid fibers. The cord is more preferably a steel cord. In the tire 2, the center portion C, the intermediate portion M, and the outer end portion E are formed from the same type of strip 32. However, the center portion C, the intermediate portion M, and the outer end portion E may be formed from different strips, respectively.

In the present invention, the dimensions and angles of the components of the tire 2 are measured on the cross-section shown in FIG. 1. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Hereinafter, effects of the present invention will become apparent according to examples. However, the present invention should not be restrictively construed based on the description of examples.

Example 1

A tire having the structure shown in FIG. 1 was obtained. The tire was a front tire for a two-wheeled automotive vehicle. The size of the tire was 120/70ZR17.

Comparative Example 1

A tire having a conventional structure was prepared. In the tire, a band cord was wound substantially in the circumferential direction from one end to the other end in the axial direction. The other structures were the same as in example 1. The tire was a commercially available tire.

Comparative Example 2

A tire in which a band cord was wound in the circumferential direction so as to be tilted from one end to the other end in the axial direction, was obtained. In the tire, the band cord extended from one end to the other end in the axial direction so as to form a mesh-like shape. The other structures were the same as in example 1.

Comparative Example 3

A tire in which the band cord was wound in the circumferential direction so as to be tilted in the intermediate portion and the outer end portion of the band, was obtained. In the tire, the band cord extended so as to form a mesh-like shape in a pair of the intermediate portions and a pair of the outer end portions. The other structures were the same as in Example 1.

Examples 2 to 4

The tires of examples 2 to 4 were each obtained in the same manner as in example 1 except that the gap W1 was as indicated in Table 1.

[Stability at High Speed, Steering Stability During High Speed Cornering, and Cornering Performance]

The above-described front tires and commercially available rear tires were prepared. The tire size of the rear tire was 180/55ZR17. The front tire and the rear tire were mounted on a normal rim, and inflated with air to a normal internal pressure. The tires were mounted to a two-wheeled automotive vehicle having an engine displacement of 1000 cc (1000 cm$^3$). The two-wheeled automotive vehicle was caused to run on a racing circuit, and a rider was caused to evaluate stability during high speed straight running, steering stability during high speed cornering, and cornering performance. The stability during high speed straight running is stability during straight running at a high speed. The steering stability during high speed cornering is steering stability during cornering at a high speed. The cornering performance is a running performance in cornering. The results are indicated below as indexes in Table 1. The indexes are evaluated in a scale of 10 with the index for comparative example 1 being a reference value of 5. The greater the value of the index is, the better the evaluation is.

[Durability]

The front tire was mounted on a normal rim, and inflated with air to an internal pressure of 235 kPa. The tire was mounted to a drum type tire testing machine, and a vertical load of 2.86 kN was applied to the tire. Running with the tire was performed on the drum having the radius of 1.7 m at a speed of 80 km/h. A running distance until the tire was broken was measured. The results are indicated below as indexes in Table 1. The index is indicated with the index for comparative example 1 being a reference value of 100. The greater the value of the index is, the better the evaluation is.

TABLE 1

| | | Comp. Ex. 1 | Comp. EX. 2 | Comp. EX. 3 | Ex. 1 | Ex. 2 | Ex. 3 | Ex. 4 |
|---|---|---|---|---|---|---|---|---|
| Band | Center portion | C | T | C | C | C | C | C |
| | Intermediate portion | C | T | T | T | T | T | T |
| | Outer end portion | C | T | T | C | C | C | C |
| | W1 (mm) | — | — | — | 0 | 2 | 4 | 6 |
| Stability during high speed straight running | | 5 | 4 | 5 | 5 | 5 | 5 | 5 |
| Steering stability during high speed cornering | | 5 | 4 | 4 | 5 | 5 | 5 | 4.5 |
| Cornering performance | | 5 | 7 | 7 | 7 | 7 | 7 | 6.5 |
| Durability | | 100 | 60 | 70 | 95 | 90 | 80 | 65 |

C: circumferential direction
T: tilted

As indicated in Table 1, the tires of examples are superior in cornering performance to the tire of comparative example 1. The tires of examples are superior, in steering stability during high speed cornering, to the tires of comparative examples 2 and 3. The evaluation results clearly indicate that the present invention is superior.

The tire according to the present invention is widely applicable as a tire for a two-wheeled automotive vehicle. The tire is also applicable as a rear tire for a two-wheeled automotive vehicle.

The foregoing description is in all aspects illustrative, and various modifications can be devised without departing from the essential features of the invention.

What is claimed is:

1. A tire for a two-wheeled automotive vehicle, the tire comprising:
   a tread;
   a carcass; and
   a band, wherein
   the band is layered inward of the tread in a radial direction and outward of the carcass in the radial direction,
   the band includes a center portion disposed at a center in an axial direction, a pair of intermediate portions each disposed outward of the center portion in the axial direction, and a pair of outer end portions disposed outward of the intermediate portions, respectively, in the axial direction;
   the center portion is formed from a first band member that is formed from a cord and a topping rubber and that extends in a circumferential direction,
   each intermediate portion is formed from a second band member that is formed from a cord and a topping rubber and that extends so as to form a mesh-like shape, the second band member including a plurality of first tilt portions extending so as to be tilted relative to the circumferential direction and a plurality of second tilt portions extending so as to be tilted relative to the circumferential direction in a direction opposite to a direction in which the first tilt portions are tilted,
   each outer end portion is formed from a third band member that is formed from a cord and a topping rubber and that extends in the circumferential direction;
   wherein an outer end, in the axial direction, of the first band member of the center portion and an inner end, in the axial direction, of the second band member of the intermediate portion are joined to or spaced by a gap from each other, and an outer end, in the axial direction, of the second band member of the intermediate portion and an inner end, in the axial direction, of the third band member of the outer end portion are joined to or spaced by a gap from each other;
   wherein a gap between an outer end, in the axial direction, of the second band member and an inner end, in the axial direction, of the third band member, is not greater than 4 mm; and
   wherein a gap between an outer end, in the axial direction, of the first band member and an inner end, in the axial direction, of the second band member is not greater than 4 mm.

2. The tire according to claim 1, wherein
each intermediate portion has a plurality of first circumferentially extending portions;
the first circumferentially extending portions form an outer end, in the axial direction, of the intermediate portion, and extend in the circumferential direction, and
the first circumferentially extending portions are disposed between the first tilt portions and the second tilt portions, and are continuous with the first tilt portions and the second tilt portions, respectively.

3. The tire according to claim 2, wherein
each intermediate portion has a plurality of second circumferentially extending portions,
the second circumferentially extending portions form an inner end, in the axial direction, of the intermediate portion, and extend in the circumferential direction, and
the second circumferentially extending portions are disposed between the first tilt portions and the second tilt portions, and are continuous with the first tilt portions and the second tilt portions, respectively.

4. The tire according to claim 1, wherein
each intermediate portion has a plurality of second circumferentially extending portions,
the second circumferentially extending portions form an inner end, in the axial direction, of the intermediate portion, and extend in the circumferential direction, and
the second circumferentially extending portions are disposed between the first tilt portions and the second tilt portions, and are continuous with the first tilt portions and the second tilt portions, respectively.

5. The tire according to claim 1, wherein the cord of each of the center portion, the intermediate portions, and the outer end portions is formed from a steel.

6. The tire according to claim 1, wherein the cord of each of the center portion, the intermediate portions, and the outer end portions is formed from an aramid fiber.

\* \* \* \* \*